(12) United States Patent
Benabdallah et al.

(10) Patent No.: US 12,548,041 B1
(45) Date of Patent: Feb. 10, 2026

(54) DIGITAL PROMOTION GENERATING SYSTEM AND RELATED METHODS

(71) Applicant: Inmar Brand Solutions, Inc., Winston-Salem, NC (US)

(72) Inventors: Jaafar Benabdallah, Cary, NC (US); Samuel Edeh, Lawrenceville, GA (US); Kathryn Rouse, Winston-Salem, NC (US)

(73) Assignee: INMAR BRAND SOLUTIONS, INC., Winston-Salem, NC (US)

( * ) Notice: Subject to any disclaimer, the term of this patent is extended or adjusted under 35 U.S.C. 154(b) by 62 days.

(21) Appl. No.: 18/735,111

(22) Filed: Jun. 5, 2024

(51) Int. Cl.
 *G06Q 30/02* (2023.01)
 *G06Q 30/0207* (2023.01)

(52) U.S. Cl.
 CPC ................................ *G06Q 30/0224* (2013.01)

(58) Field of Classification Search
 CPC ........ G06Q 30/0224; G06Q 30/0207–30/0277
 See application file for complete search history.

(56) References Cited

U.S. PATENT DOCUMENTS

| | | | |
|---|---|---|---|
| 9,342,835 B2 | 5/2016 | Fordyce, III et al. | |
| 10,096,043 B2 | 10/2018 | Beck et al. | |
| 10,956,924 B2 * | 3/2021 | Carlson | G06Q 30/0207 |
| 11,244,340 B1 * | 2/2022 | Morin | G06F 18/214 |
| 11,354,702 B2 | 6/2022 | Andreou | |
| 11,386,465 B1 * | 7/2022 | Rapaport | G06Q 30/0222 |
| 11,676,180 B1 * | 6/2023 | Kim | G06Q 30/0269 |
| | | | 705/14.66 |
| 11,880,856 B1 * | 1/2024 | Keeter | G06Q 30/014 |
| 11,900,410 B1 * | 2/2024 | Jump | G06Q 30/0224 |
| 11,922,447 B1 * | 3/2024 | Chiu | G06Q 30/0224 |
| 12,039,564 B2 * | 7/2024 | Keng | G06N 5/01 |
| 2019/0087804 A1 * | 3/2019 | Cluxton | G06Q 20/387 |
| 2020/0005347 A1 * | 1/2020 | Boal | G06Q 30/0245 |
| 2020/0380541 A1 * | 12/2020 | Laing | G06Q 30/0244 |
| 2022/0198498 A1 * | 6/2022 | Huang | G06Q 20/387 |
| 2022/0215426 A1 * | 7/2022 | Resnick Kossick | G06Q 30/0246 |

(Continued)

OTHER PUBLICATIONS

Ostos et al., U.S. Appl. No. 18/634,955, filed Apr. 14, 2024.

*Primary Examiner* — Thuy N Nguyen
(74) *Attorney, Agent, or Firm* — ALLEN, DYER, DOPPELT, + GILCHRIST, P.A. Attorneys at Law

(57) ABSTRACT

A digital promotion generating system may include a user promotion generator device and a digital promotion generating server. The server may cooperate with the user promotion generator device to obtain content relating to a proposed digital promotion for a product for purchase and store historical promotion data associated with historical digital promotions. The server may generate a historical promotion embedding database based upon the stored historical promotion data and operate a first large language model (LLM) to generate an embedding and identify similar historical promotions to the proposed promotion based upon the content and the embedding database. The server may operate a first multi-modal AI model to generate promotion parameters and operate a second multi-modal AI model to generate a suggested description based upon the historical promotion data and the promotion parameters. The server may communicate the suggested description and the parameters to the user promotion generator device.

23 Claims, 10 Drawing Sheets

(56) References Cited

U.S. PATENT DOCUMENTS

| | | | | |
|---|---|---|---|---|
| 2023/0368268 A1* | 11/2023 | Wang | ................ | G06Q 30/0631 |
| 2024/0185285 A1* | 6/2024 | Keng | ................ | G06Q 30/0244 |
| 2024/0362676 A1* | 10/2024 | Bangad | .............. | G06Q 30/0211 |
| 2025/0139657 A1* | 5/2025 | Chen | .................. | G06Q 30/0211 |
| 2025/0156898 A1* | 5/2025 | Crabtree | ............ | G06Q 30/0277 |

* cited by examiner

DIGITAL PROMOTION GENERATING SYSTEM AND RELATED METHODS

TECHNICAL FIELD

The present invention relates to the field of promotion generation, and, more particularly, to generating suggested description and parameters for a proposed digital promotion, and related methods.

BACKGROUND

Sales of a particular product or service may be based upon how well that product or service is marketed to a consumer. One form of marketing or promotion is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period.

Another type of promotion is a rebate. A rebate, similarly to a coupon, also has a redeemable value and is redeemable toward a purchase of a given product. However, a rebate is typically provided, in terms of redeemable value, to the shopper, post purchase. For example, a shopper, to qualify for the rebate, may have to provide a proof-of-purchase to a manufacturer or retailer to qualify for the rebate.

A coupon may be part of an advertising campaign, for example. In addition to redemption data, the coupon may have particular text (e.g., color, size, words, etc.) and/or images (e.g., images of the product, backgrounds, etc.) that form part of the coupon.

U.S. Pat. No. 10,354,267 to Carlson et al. discloses a method that includes receiving, via a portal, from a first computing device, communications regarding programming of computing system functions for a campaign, and receiving, in a computing apparatus, a set of records for the campaign, each record identifying at least one condition for matching an event in the campaign with a user participating in the campaign to identify, via a predictive model, a subsequent event in the campaign associated with the user participating in the campaign. The method also includes storing, by a data warehouse, the set of records, monitoring, by the computing apparatus, events relevant to the campaign in accordance with the set of records for the subsequent event, and in response to receiving an authorization request from a transaction terminal, detecting that a first purchase associated with the subsequent event satisfies a first record of the set of records. The method further includes, in response to detection of the first purchase, transmitting, by the computing apparatus, a message in accordance with the first record to cause display in a first user interface of a second computing device of a first user to announce a benefit to be provided to the first user in response to a second purchase satisfying a second record of the set of records, and transmitting an electronic file to the second computing device to enable the benefit for use by the second computing device in the second purchase.

The method also includes, subsequent to announcing the benefit, modifying the programming, wherein the modifying comprises receiving, in the computing apparatus, a modification to the set of records to generate a modified set of records for the campaign, monitoring, by the computing apparatus, events relevant to the campaign in accordance with the modified set of records for events where the benefit is accepted, and selecting, from the data warehouse, based on data received from the second computing device, a user profile for the first user. The method includes, in response to modifying the programming, and based on the user profile, transmitting, by the computing apparatus, a message to announce a modification of the benefit in accordance with the modified set of records, and transmitting an updated electronic file to the second computing device to modify the benefit.

U.S. Pat. No. 10,956,924 to Carlson et al. discloses a method for the provision, on a computing apparatus, of a user interface configured via a portal to permit a merchant to define an offer campaign. The offer has a plurality of milestones required to be met to provide a benefit to a user. The computing apparatus may be further configured to associate the offer with a user, detect the progress of the user toward the milestone, and transmit a message to the user regarding the user's progress toward the milestone.

U.S. Pat. No. 10,096,043 to Beck et al. discloses a computing apparatus is configured to formulate and adjust offers to users of mobile devices that are configured to capture identification information of products, such as UPC codes. The transaction data of the user, the activities of the user capturing the identification information of products, the location of the user, and the user's reactions to the offers are used to incrementally adjust the offers according to offer rules specified by the merchants. The mobile devices can be used to initiate a checkout process for purchasing items identified by the captured identification information of the products from the physical retail store at which the user is currently located, or via an online store associated with an offer presented via the mobile device.

SUMMARY

A digital promotion generating system may include a user promotion generator device and a digital promotion generating server. The digital promotion generating server may be configured to cooperate with the user promotion generator device to obtain content relating to a proposed digital promotion for a product for purchase and store historical promotion data associated with a plurality of historical digital promotions. The digital promotion generating server may be configured to generate a historical promotion embedding database based upon the stored historical promotion data and operate an embedding model to identify similar ones of the plurality of historical digital promotions to the proposed digital promotion based upon the content and the historical promotion embedding database. The digital promotion generating server may further be configured to operate a first multi-modal artificial intelligence (AI) model to generate a plurality of promotion parameters for the proposed digital promotion and operate a second multi-modal AI model to generate a suggested promotion description for the proposed digital promotion based upon the historical promotion data and the plurality of promotion parameters. The digital promotion generating server may further be configured to communicate the suggested promotion description and the plurality of promotion parameters to the user promotion generator device.

The digital promotion generating server may be configured to operate a third multi-modal AI model to generate proposed imagery for the proposed digital promotion and communicate the proposed imagery to the user promotion generator device, for example. The digital promotion generating server may be configured to operate the first multi-modal AI model to predict redemption data for the proposed digital promotion.

The content may include a unique identifier associated with the product for purchase. The digital promotion generating server may be configured to determine if the content includes a unique identifier associated with the product for purchase, and when not so, operate another multi-modal AI model to parse the content and generate a listing of potential unique identifiers for the product for purchase, for example.

The content may include at least one of text and imagery. The text may include a natural language description of at least one of the proposed digital promotion and the product for purchase, for example.

The promotion parameters may include at least one of promotion timing, brand of the product for purchase, category of the product for purchase, duration of the proposed digital promotion, budget of the proposed digital promotion, objective of the proposed digital promotion, redemption value of the proposed digital promotion, and availability of the product for purchase, for example.

A method aspect is directed to a method of generating a digital promotion. The method may include using a digital promotion generating server to cooperate with a user promotion generator device to obtain content relating to a proposed digital promotion for a product for purchase and store historical promotion data associated with a plurality of historical digital promotions. The method may also include using the digital promotion generating server to generate a historical promotion embedding database based upon the stored historical promotion data and operate an embedding model to identify similar ones of the plurality of historical digital promotions to the proposed digital promotion based upon the content and the historical promotion embedding database.

The method may also include using the digital promotion generating server to operate a first multi-modal artificial intelligence (AI) model to generate a plurality of promotion parameters for the proposed digital promotion and operate a second multi-modal AI model to generate a suggested promotion description for the proposed digital promotion based upon the historical promotion data and the plurality of promotion parameters. The method may also include using the digital promotion generating server to communicate the suggested promotion description and the plurality of promotion parameters to the user promotion generator device.

A computer readable medium aspect is directed to a non-transitory computer readable medium for generating a digital promotion. The non-transitory computer readable medium includes computer executable instructions that when executed by a processor cause the processor to perform operations. The operations may include cooperating with a user promotion generator device to obtain content relating to a proposed digital promotion for a product for purchase and storing historical promotion data associated with a plurality of historical digital promotions. The operations may include generating a historical promotion embedding database based upon the stored historical promotion data and operating an embedding model to identify similar ones of the plurality of historical digital promotions to the proposed digital promotion based upon the content and the historical promotion embedding database.

The operations may also include operating a first multi-modal artificial intelligence (AI) model to generate a plurality of promotion parameters for the proposed digital promotion and operating a second multi-modal AI model to generate a suggested promotion description for the proposed digital promotion based upon the historical promotion data and the plurality of promotion parameters. The operations may further include communicating the suggested promotion description and the plurality of promotion parameters to the user promotion generator device.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation are used to indicate similar elements in alternative embodiments.

Figure 1:
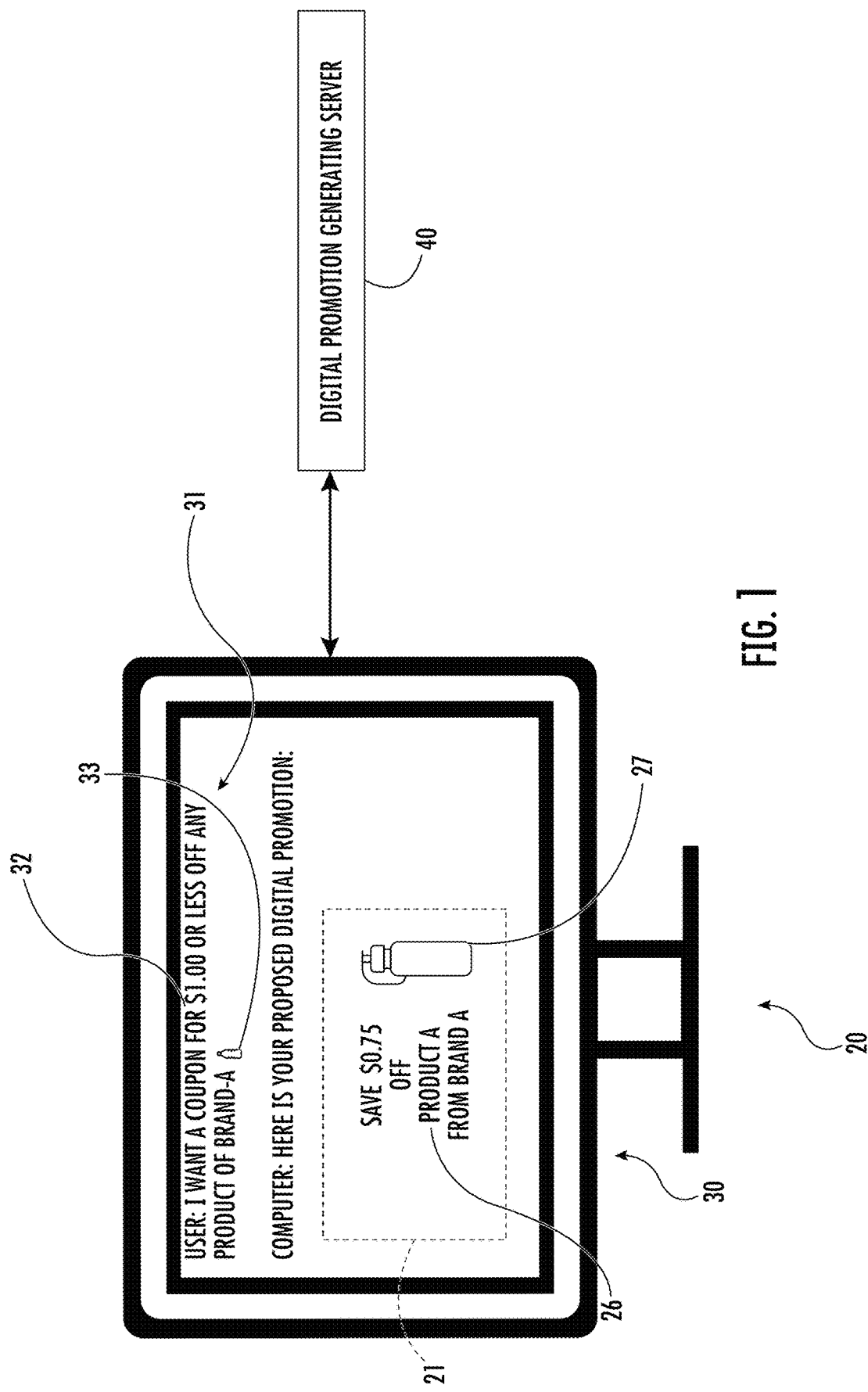
FIG. 1 is a schematic diagram of a digital promotion generating system in accordance with an embodiment.
Figure 2:
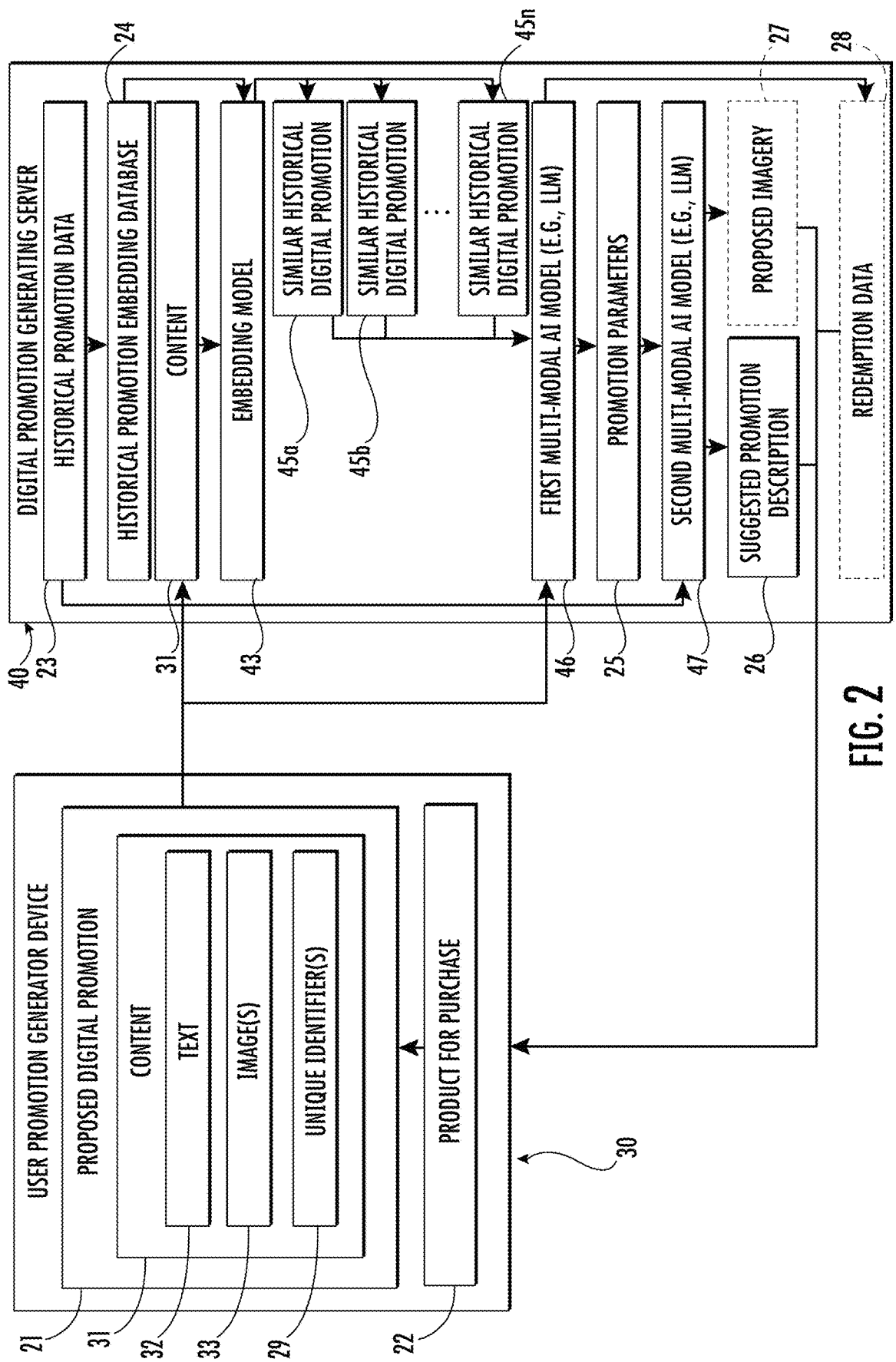
FIG. 2 is a schematic block operational diagram of the system of FIG. 1.
Figure 3:
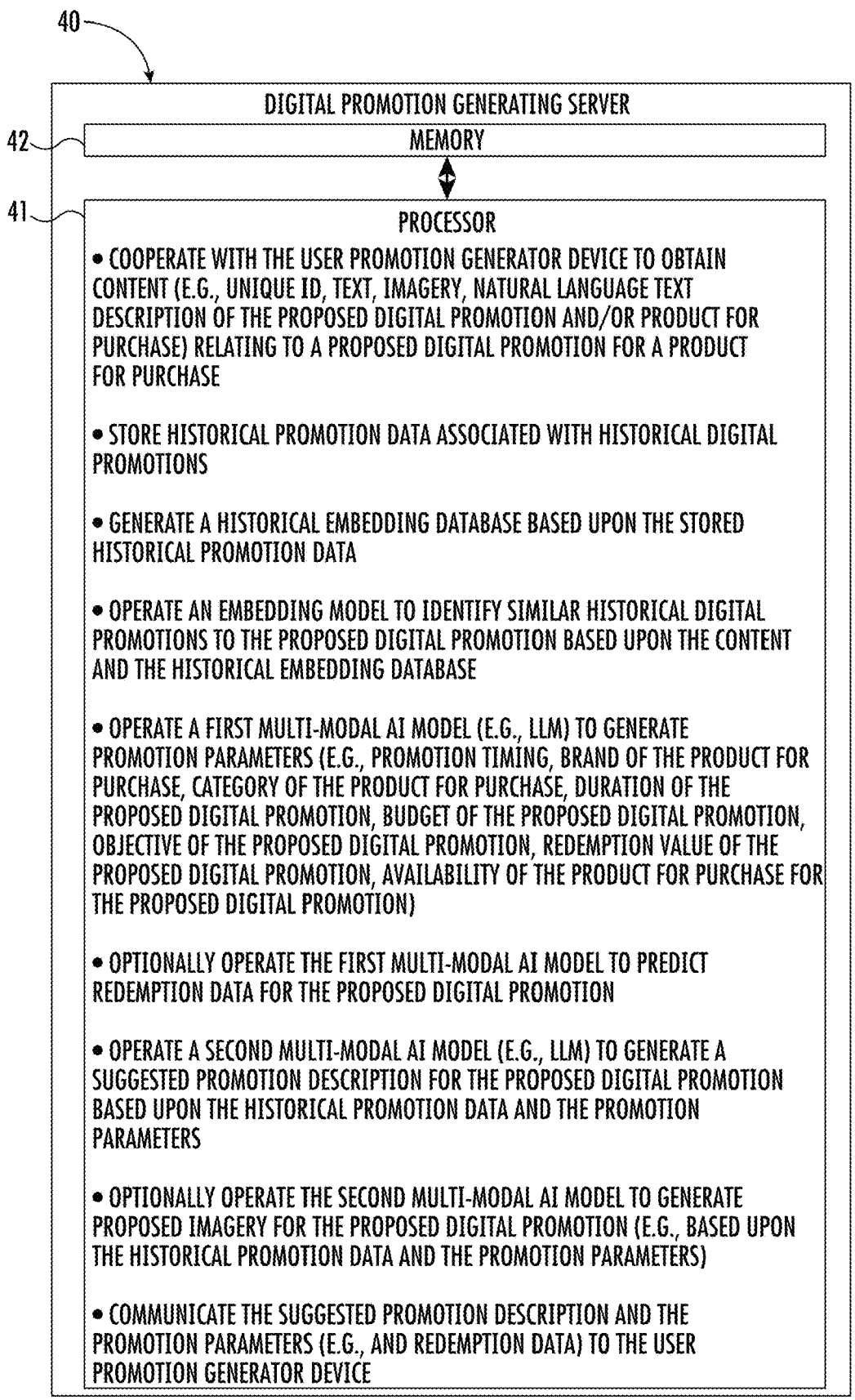
FIG. 3 is a schematic block diagram of the digital promotion generating server of FIG. 2.

Referring initially to FIGS. 1-3, a digital promotion generating system 20 includes a user promotion generator device 30. The user promotion generator device 30 is illustratively in the form of a personal computer. The user promotion generator device 30 may be in the form of another type of device, for example, a laptop computer, a mobile or smartphone, a tablet computer, or a wearable computer. The user promotion generator device 30 may be associated with a brand of products, for example. Alternatively, the user promotion generator device 30 may be associated with a digital promotion generator or content creator that may generate digital promotions for one or more brands of products for purchase.

The digital promotion generating system 20 also includes a digital promotion generating server 40. The digital promotion generating server 40 includes a processor 41 and an associated memory 42. While operations of the digital promotion generating server 40 are described herein, the operations are performed by cooperation between the processor 41 and the memory 42.

Figure 4:
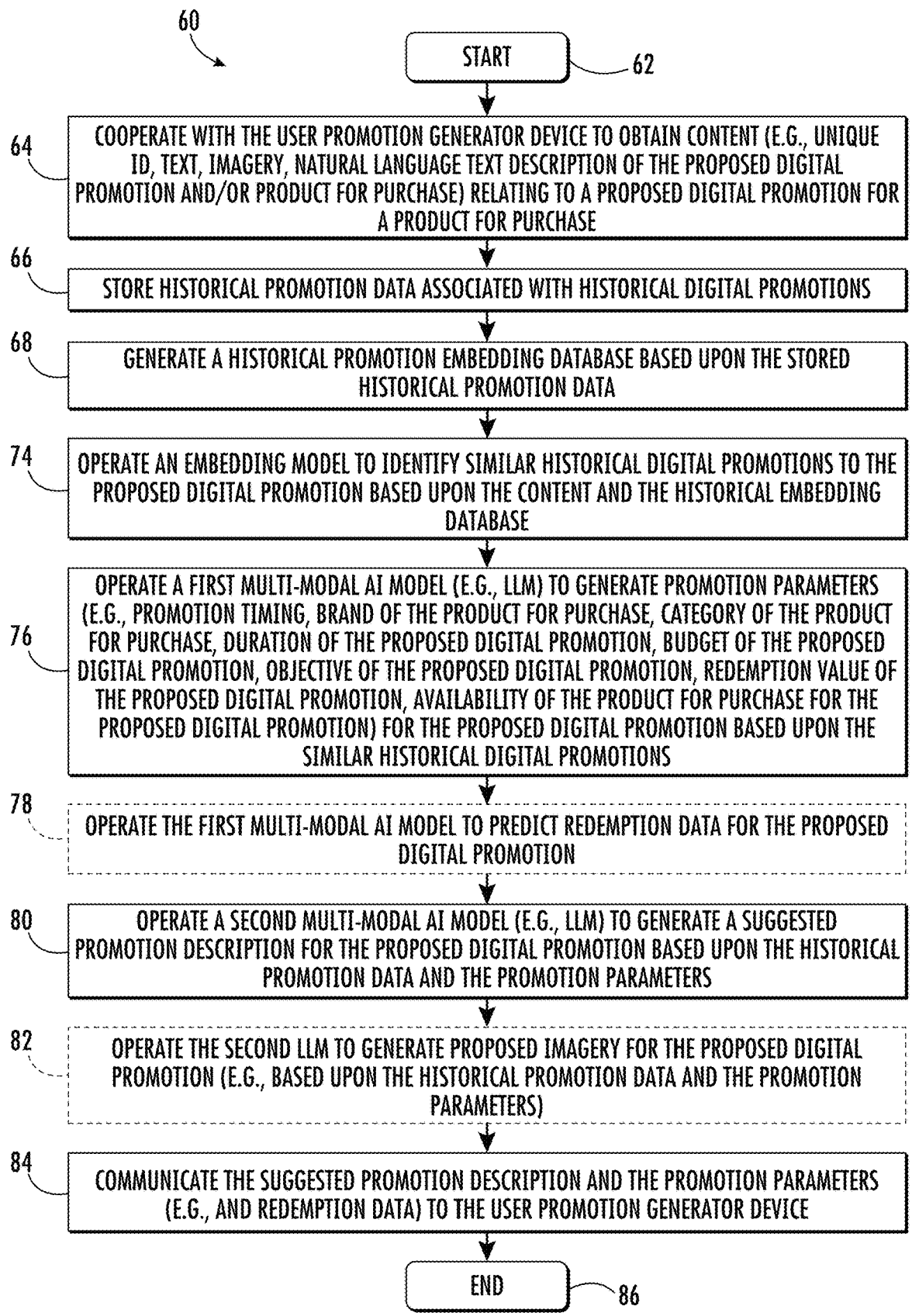
FIG. 4 is a flow diagram illustrating operation of the digital promotion generating server of FIG. 3.

Referring now additionally to the flowchart 60 in FIG. 4, beginning at Block 62, operations of the digital promotion generating server 40 will now be described. At Block 64, the digital promotion generating server 40 cooperates with the user promotion generator device 30 to obtain content 31 relating to a proposed digital promotion 21 for a product for purchase 22. More particularly, the digital promotion generating server 40 and the user promotion generator device 30 may communicate, for example, wirelessly, so that the content 31 is communicated to the digital promotion generating server. The digital promotion generating server 40 may retrieve the content 31 from the user promotion generator device 30. The user promotion generator device 30 may transmit the content 31 to the digital promotion generating server 40. In embodiments, each of the user promotion generator device 30 and the digital promotion generating server 40 may perform transmit and receive operations to communicate the content 31.

The content 31 is provided to the user promotion generator device 30, for example, by way of a graphical user interface (GUI) or by an application programming interface (API) function call. For example, a user or content generator desirous of generating a digital promotion for the product for purchase 22 may provide, via an input device of the user promotion generator device 30, text 32 and/or an image 33 (e.g., of the product for purchase 22 or a variation thereof). In other words, the content 31 may include text 32 and/or an image 33. The content 31 may also include a unique identifier 29 (e.g., uniform product code (UPC), stock keeping unit (SKU), produce lookup (PLU), global trade identification number (GTIN)) associated with the product for purchase 22. The content 31 may be considered unstructured content.

When the content 31 includes text 32, for example, the text may be a natural language description, for example, a natural language text string, of the proposed digital promotion 21 and/or the product for purchase 22. Exemplary content 31 provided at the user promotion generator device 30 may be, for example, "I want a coupon for $1.00 or less off any product of Brand-A."

The digital promotion generating server 40 stores historical promotion data 23 associated with historical digital promotions (Block 66). Historical digital promotion data 23 may include previously generated digital promotions by the digital promotion generating server 40 as described herein and/or previous digital promotions obtained from another source (e.g., not generated by the digital promotion generating server). Historical promotion data 23 may include any one or more of, associated with the corresponding historical digital promotion, promotion expiration period, product description, product identifier (e.g., uniform product code (UPC), stock keeping unit (SKU), produce lookup (PLU), global trade identification number (GTIN)), product size, product brand, product variety, redemption value, redemption location (e.g., geographic location, retailer), and imagery.

The digital promotion generating server 40 generates a historical promotion embedding database 24 based upon the stored historical promotion data 23 (Block 68). As will be appreciated by those skilled in the art, embeddings represent data such as words, text, and images, in a numerical format that computational algorithms can more easily process. In this case, the words or text and images that define the historical promotion data 23 are represented as dense vectors characterizing the historical promotion data. With respect to words, a word embedding may be considered to represent the semantic meaning of word. Words that are semantically similar in natural language generally have embeddings that are similar to each other in the encoded vector space. Words that are unrelated or opposite of one another would generally be further apart in the vector space. Conceptually, those skilled in the art will appreciate that word vectors plotted in two-dimensions illustrates multiple points, with each point indicating where the word embedding's tail lies, and clustered words represent more related words, unrelated words have a greater separation therebetween.

Text embeddings, for example, typically encode information relating to sentences, groups of words, and entire text of digital coupons. Text embeddings may not be limited to words. Thus, larger amount of text may be compared, similar to word vectors, but because text generally is representative of a larger amount of data (e.g., historical coupon data), the embeddings may be a better representation of data relative to words alone.

The historical promotion embedding database 24 may be considered a vector database, for example. As will be appreciated by those skilled in the art, a vector database may be considered a relatively efficient method to store and query embedding data, for example, the historical promotion data 23. Vector databases extend the capabilities of traditional relational databases to embeddings. However, a distinguishing feature of a vector database is that query results do not exactly match the query. Instead, a specified similarity metric is operated to return embeddings similar to the query.

At Block 74, the digital promotion generating server 40 operates an embedding model 43. The embedding model 43 may be operated to generate an embedding of the proposed digital promotion 21. The embedding model 43 may include a large language model (LLM), for example. The embedding model 43 is operated to, e.g., use the embedding of the proposed digital promotion 21, identify similar ones 45*a*-45*n* (e.g., most similar) of the historical digital promotions 23 that are similar to the proposed digital promotion 21 based upon the obtained content 31 and the historical promotion embedding database 24. A single embedding model may be used to populate the vector database (i.e., the historical promotion embedding database 24) with dense representations. The same model may be used to embed the current offer (i.e., the proposed digital promotion 21) to find similar vectors where the actual similarity search could either be, for example, strictly, a dense vector similarity search or a hybrid search technique.

As will be appreciated by those skilled in the art, an embedding model 43 may be defined by a function that generates a numerical score quantifying the relationship between two objects, in this case the relationship between the historical digital promotions and the proposed digital promotion 21.

The embedding model 43 may implement vector embedding methods. One way of training deep vector embedding for similarity scoring is to assume a given modality-specific deep embedding function (e.g., trained on relatively large data sets) that accepts, as input, the historical promotion data 23 and the proposed digital promotion 21, and outputs an embedding vector. A vector similarity function may be applied, as a cosine similarity, Jaccard similarity, or inverse Euclidean distance function. Of course, other techniques for implementing a similarity scoring embedding model may be used.

The digital promotion generating server 40, at Block 76, operates a first multi-modal AI model 46 to generate promotion parameters 25 for the proposed digital promotion 21.

Exemplary promotion parameters 25 include one or more of promotion timing, brand of the product for purchase 22, duration of the proposed digital promotion 21, budget of the proposed digital promotion, objective of the proposed digital promotion (e.g., new product introduction, increase product reach, reach new shopper demographics, expand geographical reach), redemption value of the digital promotion, and availability of the product for purchase. Of course, the promotion parameters 25 may include other and/or additional parameters related to the proposed digital promotion 21. The first multi-modal AI model 46 may be a large language model (LLM), for example. Exemplary first multi-modal AI models may include Gemini and/or GPT4.0. Of course, other models may be used. The first multi-modal AI model 46 may accept, as input thereto, the similar historical digital promotions 45a-45n including their corresponding historical promotion data 23.

As will be appreciated by those skilled in the art, a multi-modal AI model, such as, for example, the first multi-modal model 46 may accept, as input, text and/or image data, and output, text and/or image data. The first multi-modal AI model 46, for example, when in the form of an LLM, is a machine learning technique that provides language understanding and synthesis services. The first multi-modal AI model 46, for example, acquires these abilities by learning statistical relationships from text documents during a computationally intensive self-supervised and semi-supervised training process. The first multi-modal AI model 46 may be an artificial neural network and may be built with a transformer-based architecture, for example. The first multi-modal AI model 46 may be implemented using other architectures, such as, for example, recurrent neural network variants and various state space models.

More particularly, the first multi-modal AI model 46 operates as a form of generative AI, by taking, as input, the content 31 and the data of the historical promotion embedding database 24, and repeatedly predicting the next token (e.g., word, text, and/or imagery). While the first multi-modal AI model 46 has been described, it should be noted that other and/or additional multi-modal AI models or LLMs, as described herein, operate in a similar fashion.

The digital promotion generating server 40, in an embodiment, may optionally operate the first multi-modal AI model 46 to predict redemption data 28 for the proposed digital promotion 21 (Block 78). Predicted redemption data 28 may include a predicted redemption rate, a predicted clip rate, and/or a predicted redemption value over the campaign. The predicted redemption data 28 may include other and/or additional predicted data as it relates to the redemption of the proposed digital promotion 21.

At Block 80, the digital promotion generating server 40 operates a second multi-modal AI model 47 to generate a suggested promotion description 26 for the proposed digital promotion 21. The second multi-modal AI model 47 operates to generate the suggested promotion description 26 based upon the historical promotion data 23 and the promotion parameters 25 generated by the first multi-modal AI model 46. In other words, the second multi-modal AI model 47 accepts, as input, the historical promotion data 23 and the output of the first multi-modal AI model 46—the promotion parameters 25. The second multi-modal AI model 47 may generate the suggested promotion description 26 in the form of a textual description of the product for purchase, for example, "Feeling Hot This Summer? Cool Down with an Ice-Cold Brand-A Beverage!—SAVE $1.00". More particularly, the second multi-modal AI model 47 may generate the exact words, how they are connected or ordered, the amount of words, the placement of the words, and other attributes that may be considered descriptive of the proposed digital promotion 21.

The digital promotion generating server 40, at Block 82, may optionally operate the second multi-modal AI model 47 to generate proposed imagery 27 for the proposed digital promotion 21. More particularly, the second multi-modal AI model 47, in addition to generating the suggested promotion description 26, also generates proposed imagery 27 for the proposed digital promotion 21 based upon, as input to the second multi-modal AI model, the historical promotion data 23, which may include images from historical promotions, and the promotion parameters 25. The proposed imagery 27 may include one or more images of the product for purchase 22 and/or other images, such as, for example, background images, context images, and variations of the product for purchase.

At Block 84, the digital promotion generating server 40 communicates the suggested promotion description 26, optionally the proposed imagery 27, and the promotion parameters 25 to the user promotion generator device 30. The suggested promotion description 26, the proposed imagery 27, and the promotion parameters 25 may be displayed on a display of the user promotion generator device 30 for acceptance or approval, for example, for a promotional campaign. If accepted, the suggested promotion description 26, optionally the proposed imagery 27, and the promotion parameters 25 are used so that the proposed digital promotion 21 becomes a "live" digital promotion having the parameters generated by the digital promotion generating server 40 and in accordance with the operations described herein.

As will be appreciated by those skilled in the art, the digital promotion generating system 20 may be particularly advantageous for not only automating significant portions of work flows currently performed across several teams, but the system may also centralize and standardize digital promotion generating using analytics and predictive modeling, as described above, to generate a more accurate and shopper-responsive digital promotion. Operations end at Block 86.

Figure 5:
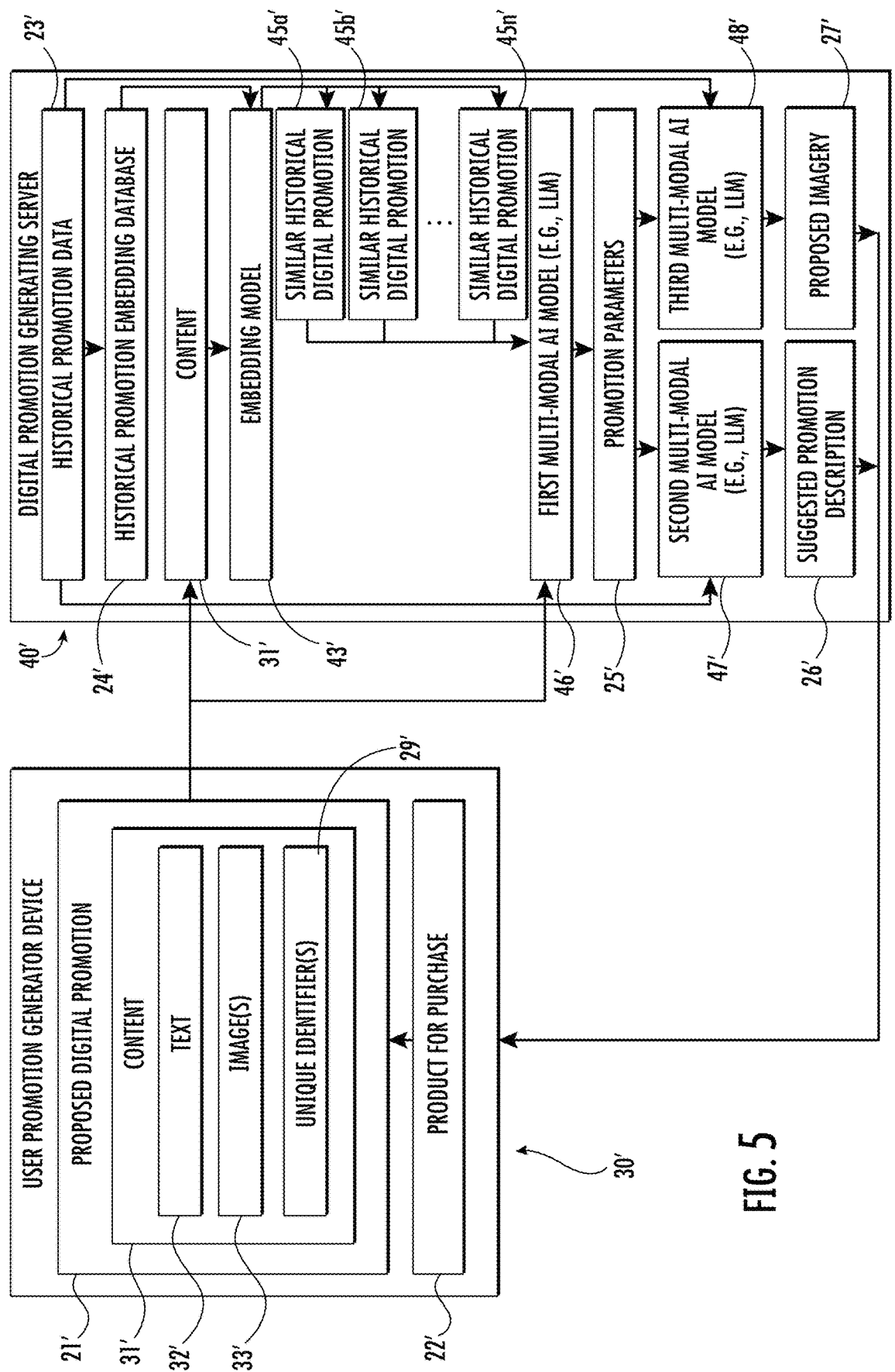
FIG. 5 is a schematic block operational diagram of a digital promotion generating system in accordance with another embodiment.
Figure 6:
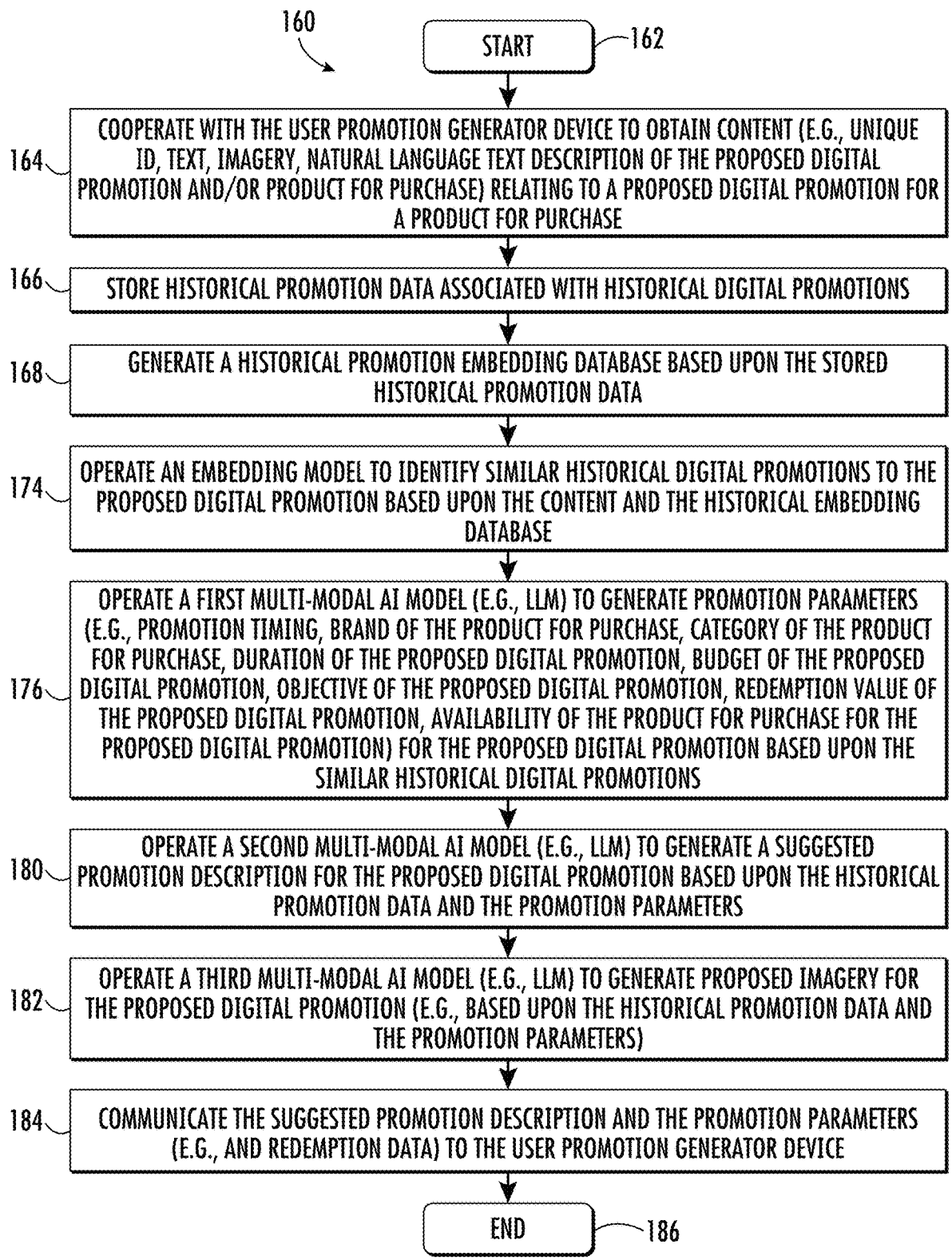
FIG. 6 is a flow diagram illustrating operation of the digital promotion generating server of FIG. 5.

Referring briefly to FIG. 5, and the flowchart 160 in FIG. 6, beginning at Block 162, operation of the digital promotion generating server 40' according to another embodiment with respect to generating proposed imagery 27' will be described. As it relates to generating the proposed imagery, 27', a third multi-modal AI model 48' may be used to generate the proposed imagery (Block 182). The third multi-modal AI model 48' is used in place of the second multi-modal AI model 47' to generate the proposed imagery 27' and accepts, as input, the historical promotion data 23' and the promotion parameters 25'. The second multi-modal AI model 47' is operated to generate the suggested promotion description 26' (Block 180), for example, as described above. In other words, the second and third multi-modal AI models 47', 48' may be operated in parallel to generate both the suggested promotion description 26' and the proposed imagery 27' for the proposed digital promotion 21' for the product for purchase 22'. Operations at Blocks 164, 166, 168, 174, 176, and 184 (e.g., obtaining content 31' (including text 32', an image 33' and a unique identifier 29'), storing historical promotion data 23', generating the historical promotion embedding database 24', operating the embedding and first multi-modal AI models 43', 46' to identify similar historical digital promotions 45a'-45n' and promotion parameters 25', respectively, are similar to the operations 64, 66, 68, 74, 76, and 84, described above. Operations end at Block 186

Figure 7:
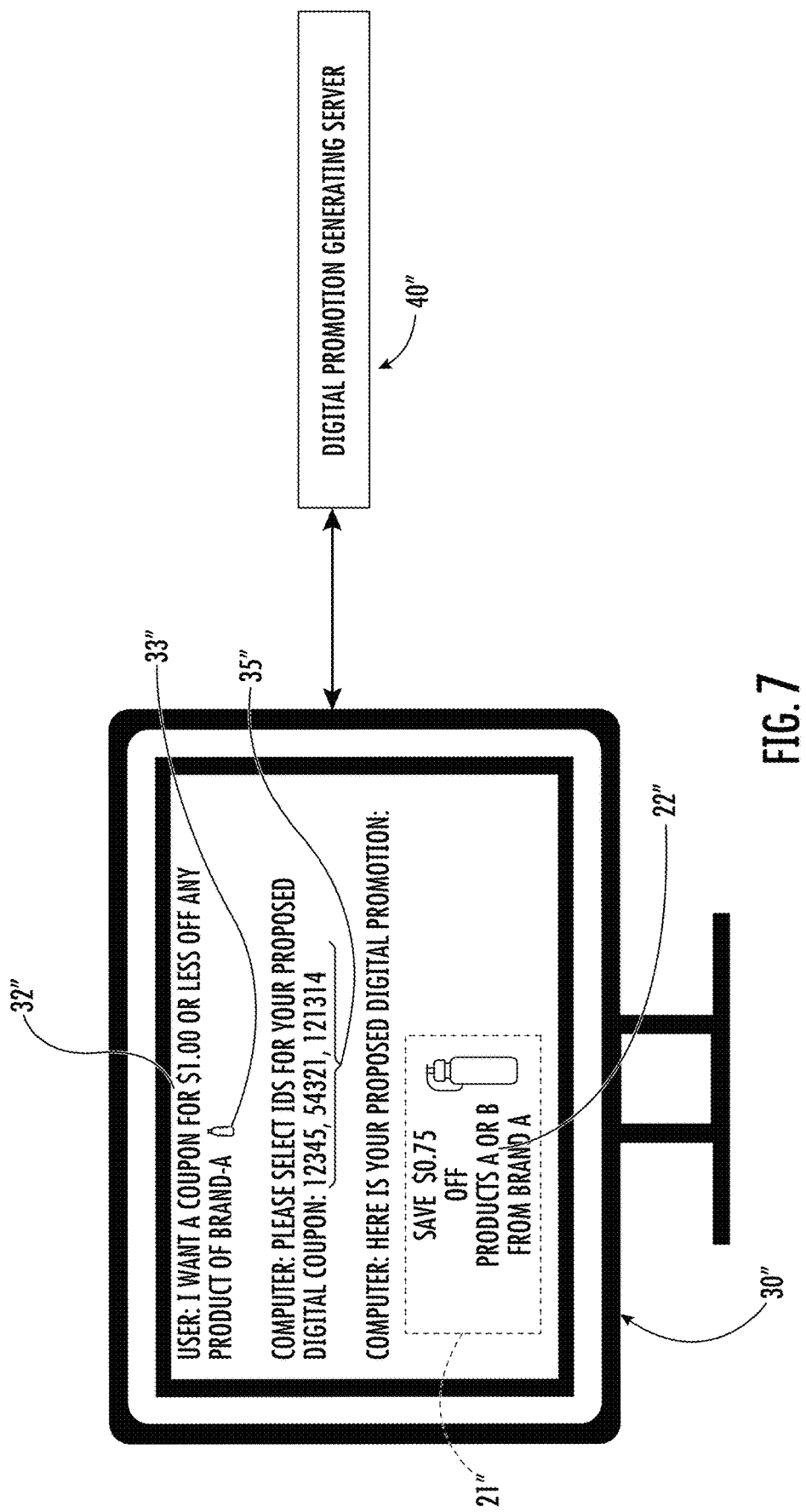
FIG. 7 is a schematic diagram of a digital promotion generating system in accordance with another embodiment.
Figure 8:
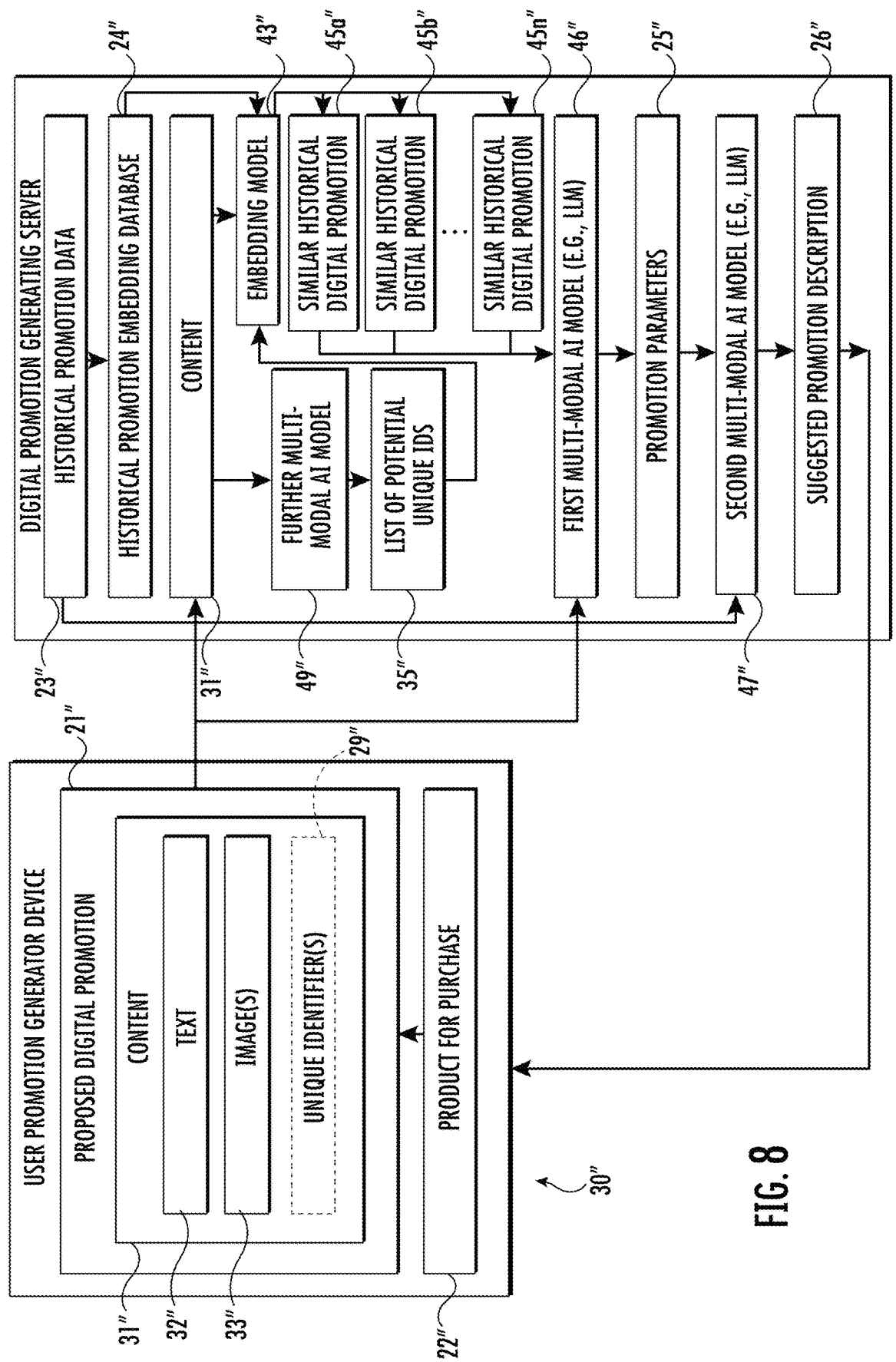
FIG. 8 is a schematic block operational diagram of the system of FIG. 7.
Figure 9A:
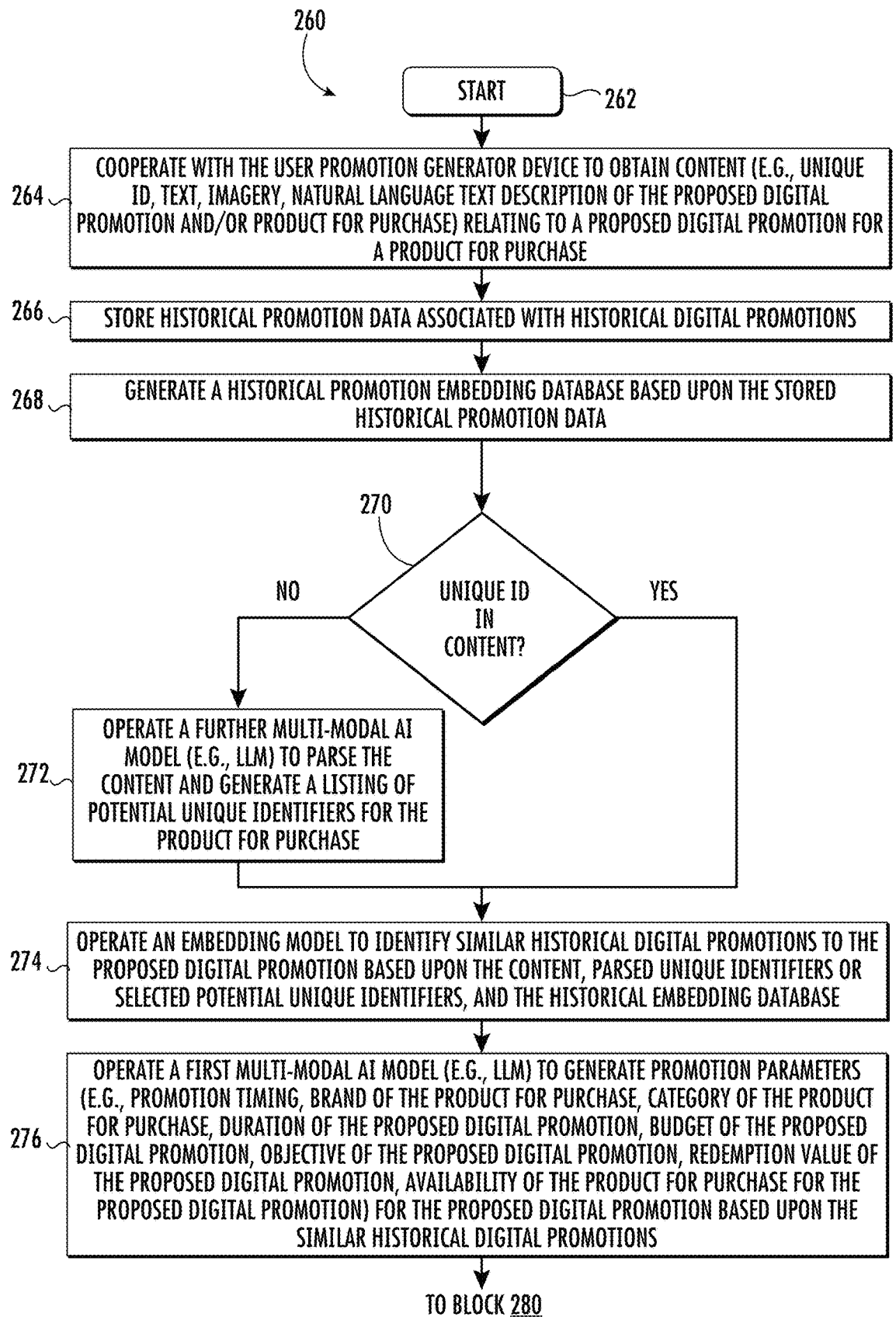
FIGS. 9A and 9B are flow diagrams illustrating operation of the digital promotion generating server of FIG. 8.
Figure 9B:
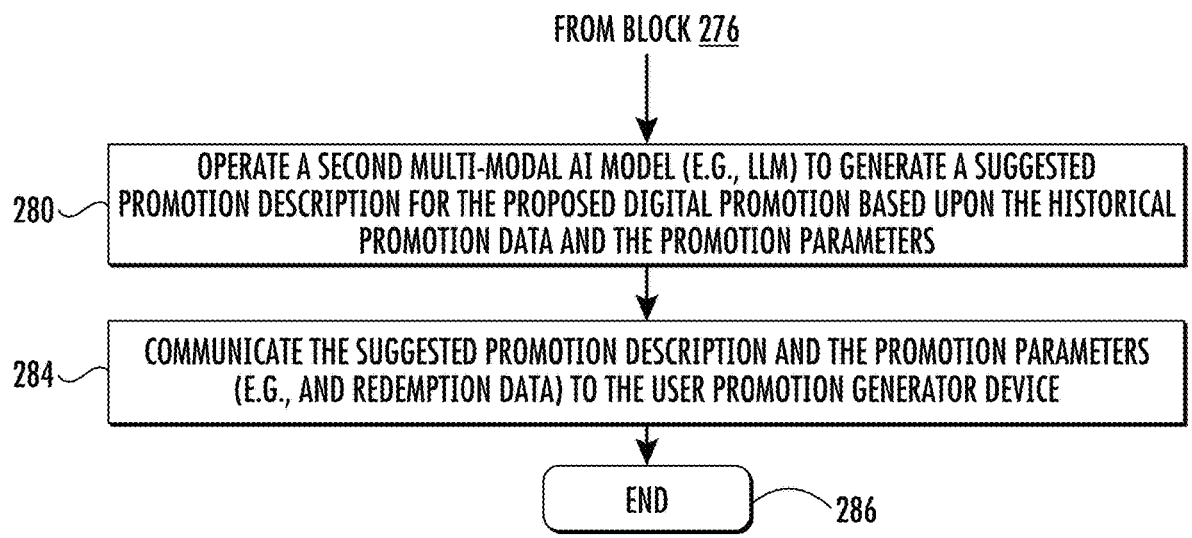

Referring now to FIGS. 7-8, and the flowchart 260 in FIGS. 9A and 9B, beginning at Block 262, operation of the digital promotion generating server 40" in accordance with another embodiment will now be described. As will be appreciated by those skilled in the art, the content 31" related to the proposed digital promotion 21" may include a unique identifier 29" associated with the product for purchase 22", as described above. The unique identifier 29", as described above, may include a UPC, SKU, PLU, or GTIN. However, as entered by the user at the user promotion generator device 30", the content 31" may not include a unique identifier 29". In such a case, it may be more difficult to identify the product for purchase 22", and thus, the similar historical promotions 45a"-45n".

Accordingly, at Block 270, the digital promotion generating server 40" determines if the content 31" includes a unique identifier 29" associated with the product for purchase 22". The digital promotion generating server 40" may parse and extract from the natural language content 31" numbers or keywords that are associated with a unique identifier, and cross-reference, for example, these extracted numbers or keywords to a database of known unique identifiers for corresponding products for purchase. The database of known unique identifies may be vector database, for example, which may also include product related text associated with the unique identifiers.

If at Block 270, the digital promotion generating server 40" determines that the content 31" does not include a unique identifier 29", the digital promotion generating server 40" operates a further multi-modal AI model 49", for example, LLM, to parse the content and generate a listing of potential unique identifiers 35" for the product for purchase 22" (Block 272). More particularly, the further multi-modal AI model 49" accepts as input, the content 31" (e.g., text 32", natural language text, image(s) 33", unique identifiers 29") and generates, as output, the listing of potential unique identifiers 35". In some embodiments, a further embedding model may be used in place of the further multi-modal AI model 49". The user may select one or more of the unique identifiers from the list of unique identifiers 35" for use in generating the proposed digital promotion 21". In other words, the proposed digital promotion 21" may be associated with products for purchase corresponding to the selected unique identifiers, for example, redeemable toward those products for purchase.

If at Block 270, the content 31" includes one or more unique identifiers 29", operations continue as described above, with the unique identifiers being input into the embedding model 43". The parsed unique identifier(s) 29" or the selected unique identifiers from the listing of potential unique identifiers 35" are input to the embedding model 43" to identify the similar historical digital promotions 45a"-45n" as described above.

Operations illustrated at Blocks 264, 266, 268, 274, 276, 280 and 284 including storing historical promotion data 23", generating the historical promotion embedding database 24", operating the first and second multi-modal AI models 46", 47" to identify promotion parameters 25", and generate suggested promotion description 26", respectively, are similar to the operations at Blocks 64, 66, 68, 74, 76, and 84, described above. Operations end at Block 286.

While several multi-modal AI models or LLMs have been described herein, those skilled in the art will be appreciate that any given multi-modal AI model LLM may be based upon one or more generative models. The precise instances of the models used may typically depend on desired performance. For example, generation of text and imagery may come from multiple calls or operations of a single instance of a given multi-modal AI model. In such a case, the given multi-modal AI model may be a large multimodal model (e.g., Gemini). Alternatively, text may be generated by one multi-modal AI model or LLM (e.g., GPT3 or Chat GPT) that may or may not have image generation capabilities with the images being generated by a separate model either one that generates images (e.g., Stable Diffusion) or one that can produce both text and images (e.g., Gemini).

Moreover, at least one of the multi-modal AI models may be operated, conceptually, as an AI agent. As an agent, the first multi-modal AI model 46, for example, may, given the input of the user generated content and the historical offer parameters, not only generate possible offer parameters (e.g., promotion parameters 25) and performance predictions, but may call other systems or services (e.g., via an API call) as part of its operations.

Accordingly, those skilled in the art will appreciate that, as an AI agent, the first multi-modal AI model 46, for example, may determine whether sufficient information to perform offer parameter creation (e.g., promotion parameters 25) and performance prediction tasks. If desired, the API calls may be made by the multi-modal AI models to obtain additional data or information. These API calls may be made to another machine learning system or AI function. The output of the API calls may be parsed to add available context information, for example, user content and historical offers. As an AI agent, the first multi-modal model 46 may generate the promotion parameters 25 and performance predictions to send to the second multi-modal AI model 47, or in embodiments, the second and third multi-modal models 47', 48'.

A method aspect is directed to a method of a generating a digital promotion. The method includes using a digital promotion generating server 40 to cooperate with a user promotion generator device 30 to obtain content 31 relating to a proposed digital promotion 21 for a product for purchase 22 and store historical promotion data 23 associated with a plurality of historical digital promotions. The method also includes using the digital promotion generating server 40 to generate a historical promotion embedding database 24 based upon the stored historical promotion data 23 and operate an embedding model 43 to generate an embedding of the proposed digital promotion 21 and identify similar ones of the plurality of historical digital promotions 45a-45n to the proposed digital promotion based upon the content 31 and the historical promotion embedding database 24.

The method also includes using the digital promotion generating server 40 to operate a first multi-modal AI model 46 to generate a plurality of promotion parameters 25 for the proposed digital promotion 21 and operate a second multi-modal AI model 47 to generate a suggested promotion description 26 for the proposed digital promotion based upon the historical promotion data 23 and the plurality of promotion parameters. The method also includes using the digital promotion generating server 40 to communicate the suggested promotion description 26 and the plurality of promotion parameters 25 to the user promotion generator device 30.

A computer readable medium aspect is directed to a non-transitory computer readable medium for generating a digital promotion. The non-transitory computer readable medium includes computer executable instructions that when executed by a processor 41 cause the processor to perform operations. The operations include cooperating with a user promotion generator device 30 to obtain content 31 relating to a proposed digital promotion 21 for a product for purchase 22 and storing historical promotion data 23 associated with a plurality of historical digital promotions. The operations include generating a historical promotion embedding database 24 based upon the stored historical promotion data 23 and operating an embedding model 43 to generate an embedding of the proposed digital promotion 21 and identify similar ones of the plurality of historical digital promotions 45a-45n to the proposed digital promotion based upon the content 31 and the historical promotion embedding database.

The operations also include operating a first multi-modal AI model 46 to generate a plurality of promotion parameters 25 for the proposed digital promotion 21 and operating a second multi-modal AI model 47 to generate a suggested promotion description 26 for the proposed digital promotion based upon the historical promotion data 23 and the plurality of promotion parameters. The operations further include communicating the suggested promotion description 26 and the plurality of promotion parameters 25 to the user promotion generator device 30.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A digital promotion generating system comprising:
    a user promotion generator device; and
    a digital promotion generating server configured to
       cooperate with the user promotion generator device to obtain content relating to a proposed digital promotion for a product for purchase,
       store historical promotion data associated with a plurality of historical digital promotions,
       generate a historical promotion embedding database based upon the stored historical promotion data,
       operate an embedding model to identify similar ones of the plurality of historical digital promotions to the proposed digital promotion based upon the content and the historical promotion embedding database,
       operate a first multi-modal artificial intelligence (AI) model to generate a plurality of promotion parameters for the proposed digital promotion,
       operate a second multi-modal AI model to generate a suggested promotion description for the proposed digital promotion based upon the historical promotion data and the plurality of promotion parameters, and
       communicate the suggested promotion description and the plurality of promotion parameters to the user promotion generator device.

2. The digital promotion generating system of claim 1 wherein the digital promotion generating server is configured to operate a third multi-modal AI model to generate proposed imagery for the proposed digital promotion and communicate the proposed imagery to the user promotion generator device.

3. The digital promotion generating system of claim 1 wherein the digital promotion generating server is configured to operate the first multi-modal AI model to predict redemption data for the proposed digital promotion.

4. The digital promotion generating system of claim 1 wherein the content comprises a unique identifier associated with the product for purchase.

5. The digital promotion generating system of claim 1 wherein the digital promotion generating server is configured to determine if the content includes the unique identifier associated with the product for purchase, and when not so, operate another multi-modal AI model to parse the content and generate a listing of potential unique identifiers for the product for purchase.

6. The digital promotion generating system of claim 1 wherein the content comprises at least one of text and imagery.

7. The digital promotion generating system of claim 6 wherein the text comprises a natural language description of at least one of the proposed digital promotion and the product for purchase.

8. The digital promotion generating system of claim 1 wherein the promotion parameters comprise at least one of promotion timing, brand of the product for purchase, category of the product for purchase, duration of the proposed digital promotion, budget of the proposed digital promotion, objective of the proposed digital promotion, redemption value of the proposed digital promotion, and availability of the product for purchase.

9. A digital promotion generating server comprising:
    a processor and an associated memory configured to
       cooperate with a user promotion generator device to obtain content relating to a proposed digital promotion for a product for purchase,
       store historical promotion data associated with a plurality of historical digital promotions,
       generate a historical promotion embedding database based upon the stored historical promotion data,
       operate an embedding model to identify similar ones of the plurality of historical digital promotions to the proposed digital promotion based upon the content and the historical promotion embedding database,
       operate a first multi-modal artificial intelligence (AI) model to generate a plurality of promotion parameters for the proposed digital promotion,
       operate a second multi-modal AI model to generate a suggested promotion description for the proposed digital promotion based upon the historical promotion data and the plurality of promotion parameters, and
       communicate the suggested promotion description and the plurality of promotion parameters to the user promotion generator device.

10. The digital promotion generating server of claim 9 wherein the processor is configured to operate a third multi-modal AI model to generate proposed imagery for the proposed digital promotion and communicate the proposed imagery to the user promotion generator device.

11. The digital promotion generating server of claim 9 wherein the processor is configured to operate the first multi-modal AI model to predict redemption data for the proposed digital promotion.

12. The digital promotion generating server of claim 9 wherein the content comprises a unique identifier associated with the product for purchase.

13. The digital promotion generating server of claim 9 wherein the processor is configured to determine if the content includes a unique identifier associated with the product for purchase, and when not so, operate another multi-modal AI model to parse the content and generate a listing of potential unique identifiers for the product for purchase.

14. The digital promotion generating server of claim 9 wherein the content comprises a natural language description of at least one of the proposed digital promotion and the product for purchase.

15. A method of generating a digital promotion comprising:
 using a digital promotion generating server to
  cooperate with a user promotion generator device to obtain content relating to a proposed digital promotion for a product for purchase,
  store historical promotion data associated with a plurality of historical digital promotions,
  generate a historical promotion embedding database based upon the stored historical promotion data,
  operate an embedding model to identify similar ones of the plurality of historical digital promotions to the proposed digital promotion based upon the content and the historical promotion embedding database,
  operate a first multi-modal artificial intelligence (AI) model to generate a plurality of promotion parameters for the proposed digital promotion,
  operate a second multi-modal AI model to generate a suggested promotion description for the proposed digital promotion based upon the historical promotion data and the plurality of promotion parameters, and
  communicate the suggested promotion description and the plurality of promotion parameters to the user promotion generator device.

16. The method of claim 15 wherein using the digital promotion generating server comprises using the digital promotion generating server to operate a third multi-modal AI model to generate proposed imagery for the proposed digital promotion and communicate the proposed imagery to the user promotion generator device.

17. The method of claim 15 wherein using the digital promotion generating server comprises using the digital promotion generating server to operate the first multi-modal AI model to predict redemption data for the proposed digital promotion.

18. The method of claim 15 wherein using the digital promotion generating server comprises using the digital promotion generating server to determine if the content includes a unique identifier associated with the product for purchase, and when not so, operate another multi-modal AI model to parse the content and generate a listing of potential unique identifiers for the product for purchase.

19. A non-transitory computer readable medium for generating a digital promotion, the non-transitory computer readable medium comprising computer executable instructions that when executed by a processor cause the processor to perform operations comprising:
 cooperating with a user promotion generator device to obtain content relating to a proposed digital promotion for a product for purchase,
 storing historical promotion data associated with a plurality of historical digital promotions,
 generating a historical promotion embedding database based upon the stored historical promotion data,
 operating an embedding model to identify similar ones of the plurality of historical digital promotions to the proposed digital promotion based upon the content and the historical promotion embedding database,
 operating a first multi-modal artificial intelligence (AI) model to generate a plurality of promotion parameters for the proposed digital promotion,
 operating a second multi-modal AI model to generate a suggested promotion description for the proposed digital promotion based upon the historical promotion data and the plurality of promotion parameters, and
 communicating the suggested promotion description and the plurality of promotion parameters to the user promotion generator device.

20. The non-transitory computer readable medium of claim 19 wherein the operations comprise operating a third multi-modal AI model to generate proposed imagery for the proposed digital promotion and communicate the proposed imagery to the user promotion generator device.

21. The non-transitory computer readable medium of claim 19 wherein the operations comprise operating the first multi-modal AI model to predict redemption data for the proposed digital promotion.

22. The non-transitory computer readable medium of claim 19 wherein the operations comprise determining if the content includes the unique identifier associated with the product for purchase, and when not so, operating another multi-modal AI model to parse the content and generate a listing of potential unique identifiers for the product for purchase.

23. The non-transitory computer readable medium of claim 19 wherein the content comprises a natural language description of at least one of the proposed digital promotion and the product for purchase.

\* \* \* \* \*